United States Patent [19]

Perreault et al.

[11] Patent Number: 5,596,577
[45] Date of Patent: Jan. 21, 1997

[54] METHOD AND SYSTEM FOR PROVIDING ACCESS BY SECONDARY STATIONS TO A SHARED TRANSMISSION MEDIUM

[75] Inventors: John A. Perreault, Hopkinton; Abhay Joshi; Mete Kabatepe, both of Norwood; Lawrence W. Lloyd, Wrentham; Stephen Schroeder, Stoughton, all of Mass.

[73] Assignee: Motorola, Inc., Schaumburg, Ill.

[21] Appl. No.: 433,905

[22] Filed: May 2, 1995

[51] Int. Cl.⁶ ................................................. H04Q 9/00
[52] U.S. Cl. ................................. 370/449; 340/825.08
[58] Field of Search .............................. 370/85.8, 95.2, 370/95.1, 95.3, 84, 85.7, 85.6; 340/825.08, 825.51, 825.06, 825.07; 455/53.1, 54.1, 54.2, 34.1, 34.2

[56] References Cited

U.S. PATENT DOCUMENTS

| | | | |
|---|---|---|---|
| 4,683,531 | 7/1987 | Kelch et al. | 340/825.08 |
| 4,736,371 | 4/1988 | Tejima et al. | 370/95.2 |
| 4,829,297 | 5/1989 | Ilg et al. | 340/825.08 |
| 4,940,974 | 7/1990 | Sojka | 340/925.08 |

*Primary Examiner*—Douglas W. Olms
*Assistant Examiner*—Ajit Patel
*Attorney, Agent, or Firm*—J. Ray Wood

[57] ABSTRACT

A method for providing access by secondary stations (12, 14, 16) to a shared transmission medium, maintains a list of secondary stations (12, 14, 16). A poll is transmitted poll by a primary station (10) to one of the secondary stations (12, 14, 16). The secondary station (12, 14, 16) waits for a poll, examines the transmission allocation, determines if there is congestion and transmits, along with the data in response to the poll, information regarding congestion. A system for providing such access includes a primary station (10) and a plurality of secondary stations (12, 14, 16). The primary station includes a polling controller (30), a receiver (32), a transmitter (34), a summer (36), a secondary station poll list database (38) and a data traffic controller (40).

8 Claims, 2 Drawing Sheets

METHOD AND SYSTEM FOR PROVIDING ACCESS BY SECONDARY STATIONS TO A SHARED TRANSMISSION MEDIUM

FIELD OF THE INVENTION

The invention relates generally to data communications.

CROSS REFERENCE TO RELATED APPLICATION

This application is related to the following United States Patent Applications, all assigned to the assignee of this application, incorporated by reference herein, as follows:

Ser. No. 08/432,749 filed on May 2, 1995 entitled. METHOD AND APPARATUS FOR A HYBRID CONTENTION AND POLLING PROTOCOL Ser. No. 08/433,877 filed on May 2, 1995 entitled. METHOD, DEVICE AND SYSTEM FOR MULTILINK POLLING Ser. No. 08/433,878 filed on May 2, 1995 entitled. METHOD AND SYSTEM FOR MANAGEMENT OF FREQUENCY SPECTRUM AMONG MULTIPLE APPLICATIONS ON A SHARED MEDIUM Ser. No. 08/437,106 filed on May 5, 1995 entitled. METHOD AND APPARATUS FOR A HYBRID LIMITED CONTENTION AND POLLING PROTOCOL Ser. No. 08/433,876 filed on May 2, 1995 entitled. SYSTEM AND METHOD FOR HYBRID CONTENTION/POLLINGPROTOCOL COLLISION RESOLUTION USING A COLLISION RESOLUTION USING A DEPTH FIRST SEARCH TECHNIQUE Ser. No. 08/434,334 filed on May 2, 1995 entitled. METHOD AND SYSTEM FOR MANAGEMENT OF FREQUENCY SPECTRUM AMONG MULTIPLE APPLICATIONS ON A SHARED MEDIUM

BACKGROUND OF THE INVENTION

In some configurations, a computer network has a primary station communicating with a number of secondary stations. A secondary station could be a modem designed to transmit and receive data over the cable television infrastructure. The primary station could be a modem server equipped with transmitters and receivers for exchanging data with modems over the cable television infrastructure.

In one type of network, the primary station sends information to the secondary stations on a downstream channel. The secondary station sends information to the primary station on an upstream channel. The master station controls the communication to and from the secondary station. As the number of secondary stations attached to the primary station increases, the control of the communication between the master station and the secondary station increases in complexity.

Protocols have been developed to assist in the control of such communication. One such protocol employs a polling discipline. The polling discipline provides multiple transmission devices shared access to a transmission medium. The primary station controls the access of secondary stations to the transmission medium by transmitting polls addressed to individual secondary stations in a sequential fashion. Typically, the master station limits the amount of data that can be sent in response to a poll to a fixed number of frames.

This approach suffers from two problems. First, in systems where the frame size is variable, the primary station has no knowledge, before transmitting a poll as to the nature or amount of data that will be returned in response to the poll. As a result, secondary stations with few large frames have better performance than secondary stations with many small frames.

Second, since the number of frames that can be sent in response to a poll is fixed, the system cannot quickly adapt to changing data traffic patterns on the shared medium. The only way to change the data traffic pattern is to change the number of frames that can be sent in response to a poll. This requires either reconfiguration of secondary stations or control signaling, either of which expends bandwidth and time.

An improved protocol is, therefore, highly desirable.

DETAILED DESCRIPTION OF THE DRAWINGS

An improved protocol provides shared access to the transmission medium in a fair manner and provides a rapid response to changing data traffic patterns. The protocol provides for dynamically controlling the amount of data that can be sent in response to a poll by including an information element, within each poll, which specifies the maximum amount of data, in bytes, that can be sent in response to that poll. The protocol further provides for dynamically responding to changing data traffic patterns on the shared medium by incorporating the ability to detect the presence of data congestion within a secondary station.

Figure 1:
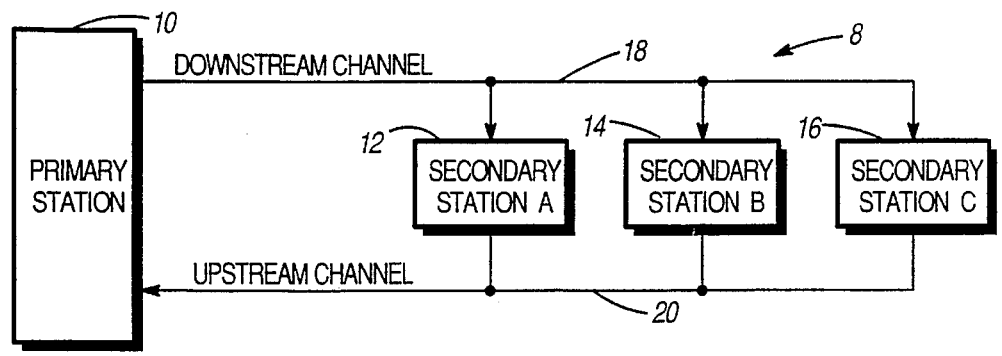
FIG. 1 is a system block diagram

FIG. 1 shows a data communication system 8 for providing access by secondary stations to a shared transmission medium. Primary station 10 communicates with a number of secondary stations 12, 14, 16. Primary station 10 transmits data to one or more secondary stations 12, 14, 16 by way of a shared transmission media. The shared transmission media could be a coaxial cable or hybrid fiber optic/coaxial cable media utilized by the cable television infrastructure, or a twisted pair media utilized in analog and digital data communication networks, or any wireless communication media.

Downstream channel 18 provides connectivity from the primary station 10 to the secondary stations 12, 14, 16. Primary station 10 is the only device permitted to transmit on downstream channel 18. Secondary stations transmit data to the primary station on a second transmission medium, referred to as an upstream channel. Secondary stations 12, 14, 16 are not capable of transmitting data to another secondary station 12, 14, 16. Secondary stations 12, 14, 16 share the upstream channel 18. To prevent simultaneous or overlapping transmissions on the upstream channel from corrupting data, only one secondary station 12, 14, 16 is permitted to transmit data at any one time. Primary station 10 controls which secondary station may transmit data on upstream channel 20 by transmitting, on downstream channel 18, special frames of data, referred to as polls, addressed to one of the secondary stations 12, 14, 16. Upon receiving the poll, the secondary station then may transmit on upstream channel 20.

Downstream channel could be a radio frequency analog channel occupying a 6 megahertz portion of bandwidth anywhere in the cable television frequency spectrum from 5 megahertz to 1 gigahertz. Typically, downstream channels utilized for data transmission are in the 350 megahertz to 1 gigahertz portion of the available frequency spectrum. Data transmission on a 6 megahertz downstream channel employ a 64 state quadrature amplitude modulation scheme with a symbol rate of 5 million symbols per second and 6 bits per symbol for a data rate of 30 million bits per second.

The upstream channel could be a radio frequency analog channel occupying a 600 kilohertz portion of bandwidth anywhere in the cable television frequency spectrum from 5 megahertz to 1 gigahertz. Typically, upstream channels utilized for data transmission are in the 5 megahertz to 42 megahertz portion of the available frequency spectrum. Data transmission on a 600 kilohertz upstream channel employ a differential quadrature phase shift keying modulation scheme with a symbol rate of 384 thousand symbols per second and 2 bits per symbol for a data rate of 768 thousand bits per second.

Different channel frequency bandwidth and modulation schemes. could, of course, be used.

Figure 2:
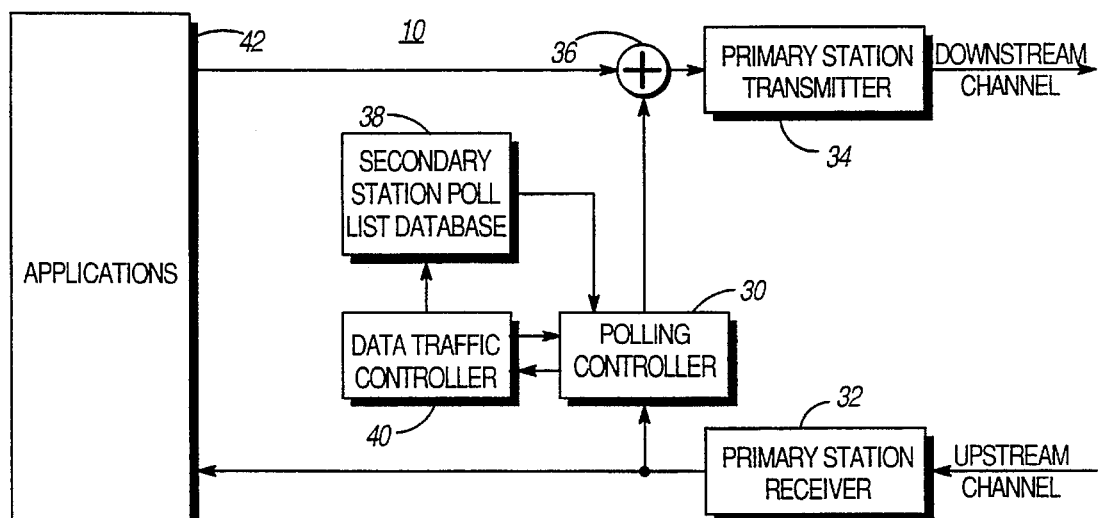
FIG. 2 is a block diagram of the primary station

Primary station 10 is shown in more detail in FIG. 2. Primary station 10 includes polling controller 30, a secondary station poll list database 38 of secondary stations to be polled, and data traffic controller 40. Polling controller 30 provides information to data traffic controller 40 such as the number of secondary stations that are responding to polls with application data, how much data is being sent by the secondary stations, and which secondary stations indicate the presence of transmit data congestion. Data traffic controller 40, assimilates this information and maintains the secondary station poll list data base in terms of polling priority of secondary stations and transmit allocation for each secondary station. Polling controller 30 transmits polls to secondary stations on downstream channel 18 via primary station transmitter 34. Summer 36 mixes polls with application data sent by the application on downstream channel 18 to secondary stations. Data transmitted by secondary stations on upstream channel 20 is accepted by primary station receiver 32. Polling controller 30 examines all the received data as it flows from receiver 32 to the application. This permits polling controller 30 to detect transmit data congestion information contained in the headers of application data frames transmitted from secondary stations.

Figure 3:
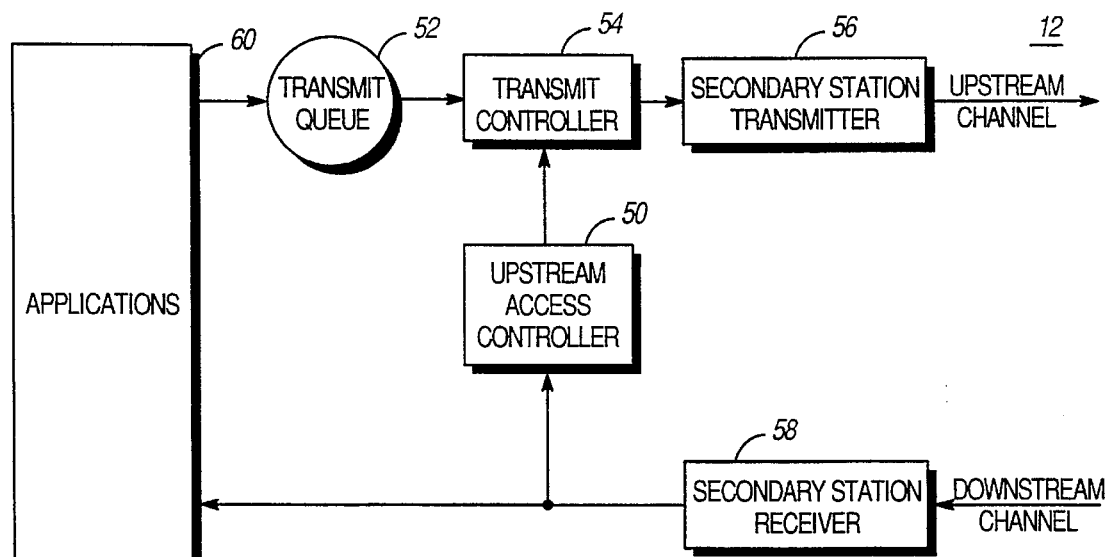
FIG. 3 is a block diagram of a secondary station

Referring to FIG. 3, a secondary station 12 includes upstream access controller 50 and transmit controller 54. Upstream access controller 50 examines all data received, on downstream channel 18, from primary station 10, via secondary station receiver 58. Some data is application data destined for the application, while other data is polls. When a poll with an address that the secondary station recognizes is received, upstream access controller 50 examines the transmit allocation information element contained in the poll. Upstream access controller 50 will provide the transmit allocation to transmit controller 54. Transmit controller 54 activates the secondary station transmitter 56 and then data transmission on upstream channel 20 begins. When the transmit allocation is exhausted, secondary station transmitter 56 is deactivated. Data traffic controller 40 also examines the amount of application data that is queued in transmit queue 52 awaiting transmission. If the amount of data is excessive, then data traffic controller 40 indicates the presence of congestion in the header of application data frames transmitted on upstream channel 20 to primary station 10.

Figure 4:
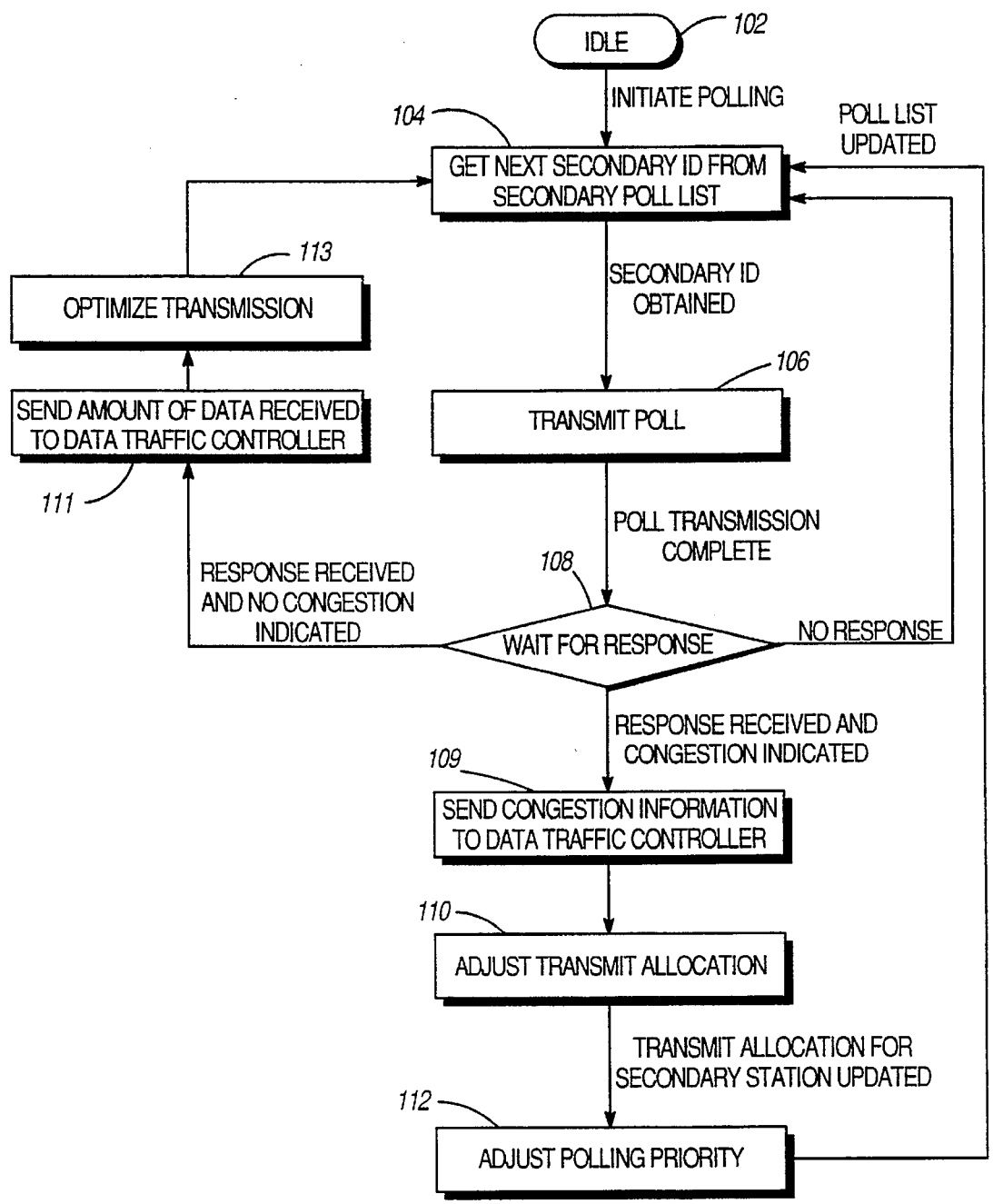
FIG. 4 is a flow chart of the protocol procedures for the primary station
Figure 5:
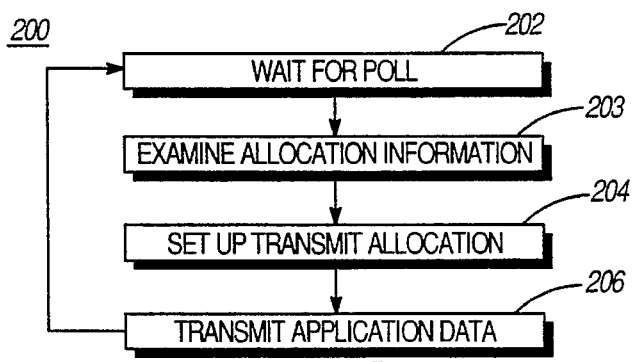
FIG. 5 is a flow chart of the protocol procedures for a secondary station

FIGS. 4 and 5 show a protocol where a primary station uses a polling discipline for controlling the access of one or more secondary stations to upstream channel 20. Included in the protocol is a means for controlling the maximum amount of data, in bytes, that a secondary station is permitted to transmit in response to a poll. Also included in the protocol is a means for detecting the presence of transmit data congestion in a secondary station.

Contained within each poll transmitted by primary station 10 is an element indicating the maximum amount of application data that may be transmitted on upstream channel 20 in response to the poll. Included within primary station 10 is a database containing identifiers, or addresses, for all secondary stations being polled. Also included in the database is a transmit allocation for each secondary station. Data traffic controller 40 in primary station 10 maintains the database. Polling controller 30 in primary station 10 obtains the addresses and transmit allocation for a secondary station from the database and transmits a poll, which includes the transmit allocation information element, addressed to that secondary station. Polling controller 30 then waits for a response from the secondary station.

FIG. 4 is a flowchart showing the steps performed at primary station 10. Primary station 10 waits (102) until polling is initiated. When polling is initiated, the polling controller 30 gets the next secondary station identification (ID) from the secondary poll list database 38. It then transmits a poll (106). After transmitting the poll, the primary station waits for a response (108).

As responses are received on upstream channel 20 from the secondary stations, polling controller 30 examines the frame headers to determine if the responding secondary station has indicated that its transmit queue is congested. Polling controller 30 informs data traffic controller 40 of how much data was received from the secondary station in response to the poll (111). If no congestion is indicated, the response is appropriately forwarded, and primary station 10 gets the next secondary station ID from secondary poll list database 38, and the process repeats.

If congestion is indicated, polling controller 30 sends the congestion information to data traffic controller 40. (109) Data traffic controller 40 then adjusts the transmission allocation for that secondary station and other secondary stations if needed (110), and adjusts the polling priority in secondary poll list database 38 (112). Adjusting the transmission allocation (110) consists of changing the amount of data the secondary station 12, 14, 16 may send to primary station 10 in response to a poll. If secondary station 12, 14, 16 is congested, the transmission allocation could be increased. On the other hand, if secondary station 12, 14, 16 has not been congested for some time, the transmission allocation could be decreased. Thus, the system attempts to continually optimize the transmission allocations between the various secondary stations.

Data traffic controller 40 will then command polling controller 30 to resume polling.

If no application data is returned in response to a poll within a predetermined time then polling controller 30 informs data traffic controller 40 that the secondary station did not transmit any data. (113) Polling controller 30 will then continue to poll the next secondary station.

Data traffic controller 40 assimilates the above mentioned inputs from polling controller 30; amount of data, if any received from each secondary station, and the presence of transmit queue congestion indicated by any secondary stations, with the number of secondary stations contained in secondary poll list database 38 and adjusts transmit allocation and polling priority in order to optimize data transmission performance on upstream channel 20.

FIG. 5 is a flowchart showing the steps performed at the secondary station. Secondary station 12 waits for a poll (202). Upon receiving a poll on downstream channel 18, upstream access controller 50 in the secondary station will examine the transmit allocation information element contained within the poll (203) and provide this information to transmit controller 54. Transmit controller 54 then sets up the transmit allocation by activating the transmitter and transmitting the data on upstream channel 20 to primary station 10. (206) Transmit controller 54 also continuously monitors the amount of application data in the transmit queue awaiting to be transmitted. If the amount of data in the transmit queue is excessive, then transmit controller 54 modifies a bit field in the header of upstream frames to indicate the presence of transmit data congestion in secondary station 12.

The method and apparatus described above has many advantages. First, the network is provided with an ability to enforce a greater degree of fairness for providing multiple secondary station shared access to a transmission medium than is possible with protocols wherein the amount of data allowed to be transmitted in response to a poll is fixed and in units of frames. Additionally, the protocol is able to provide improved network performance by dynamically varying the transmit allocation in response to changing data traffic conditions without the need for reconfiguration of secondary stations. Finally, the protocol detects transmit data congestion being experienced by a secondary station and quickly alleviates the congestion by varying transmit allocation and polling priority.

We claim:

1. A method for providing access by a secondary station, the secondary station being one of a plurality of secondary stations, to a shared transmission medium, the secondary station transmitting a quantity of data on the shared transmission medium, the access to the shared transmission medium being governed by a primary station, comprising the steps of:
   (a) maintaining a list of the plurality of secondary stations, each of the plurality of secondary stations having a transmission allocation and a polling priority;
   (b) transmitting a poll to the secondary station;
   (c) waiting for a response from the secondary station;
   (d) determining from the response if the secondary station is congested;
   (e) if the secondary station is congested
      (e)(1) increasing the transmission allocation for the secondary station;
      (e)(2) changing the polling priority of the secondary station;
   (f) if the secondary station is not congested
      (f)(1) optimizing a future transmission by the secondary station based upon the quantity of data sent by the secondary station;
   (g) waiting for said poll;
   (h) examining the transmission allocation;
   (i) determining if there is congestion at the secondary station;
   (j) if there is congestion at the secondary station, transmitting to the primary station said response indicating that there is congestion; and
   (k) transmitting data in response to the poll.

2. A method for providing access by a secondary station, the secondary station being one of a plurality of secondary stations, to a shared transmission medium comprising the steps of:
   (a) maintaining a list of the plurality of secondary stations, the secondary station having a transmission allocation and a polling priority;
   (b) transmitting a poll to the secondary station;
   (c) waiting for a response from the secondary station;
   (d) determining from the response if the secondary station is congested; and
   (e) if the secondary station is congested
      (e)(1) increasing the transmission allocation for the secondary station.

3. The method of claim 2 including the step after (e)(1), if the secondary station is congested, of
   (e)(2) changing the polling priority of the secondary station.

4. The method of claim 3 including the step after (e)(2):
   (f) if the secondary station is not congested (1) optimizing a transmission of the secondary station.

5. A method for providing access by a secondary station, the secondary station being one of a plurality of secondary stations, to a shared transmission medium, the access to the shared transmission medium being governed by a primary station, comprising the steps of:
   (a) at the primary station, maintaining a list of the plurality of secondary stations, each of plurality of secondary stations having a transmission allocation and a polling priority;
   (b) at the primary station, transmitting a poll to the secondary station;
   (c) at the primary station, waiting for a response from the secondary station;
   (d) at the primary station, determining from the response if the secondary station is congested; and
   (e) at the primary station, if the secondary station is congested:
      (e)(1) increasing the transmission allocation for the secondary station.

6. The method of claim 5 including the steps:
   (g) at the secondary station waiting for said poll;
   (h) at the secondary station, examining the transmission allocation;
   (i) at the secondary station, determining if there is congestion at the secondary station;
   (j) at the secondary station, if there is congestion at the secondary station, transmitting to the primary station said response indicating that there is congestion; and
   (k) at the secondary station, transmitting data in response to the poll.

7. The method of claim 6, including the step of:
   (e)(2) if the secondary station is congested, changing the polling priority of the secondary station.

8. The method of claim 7 including the step of:
   (f) if the secondary station is not congested optimizing a transmission of data from the secondary station.

* * * * *